US009729541B2

(12) United States Patent
Qian

(10) Patent No.: US 9,729,541 B2
(45) Date of Patent: Aug. 8, 2017

(54) METHOD AND APPARATUS FOR MIGRATING ENCRYPTED DATA

(71) Applicant: HERE Global B.V., Veldhoven (NL)

(72) Inventor: Gaoqiang Qian, Watertown, MA (US)

(73) Assignee: HERE Global B.V., Veldhoven (NL)

( * ) Notice: Subject to any disclaimer, the term of this patent is extended or adjusted under 35 U.S.C. 154(b) by 16 days.

(21) Appl. No.: 14/674,407

(22) Filed: Mar. 31, 2015

(65) Prior Publication Data

US 2016/0294563 A1 Oct. 6, 2016

(51) Int. Cl.
*H04L 29/06* (2006.01)
*H04L 9/32* (2006.01)
*H04L 9/08* (2006.01)

(52) U.S. Cl.
CPC .......... *H04L 63/0823* (2013.01); *H04L 9/083* (2013.01); *H04L 9/3263* (2013.01); *H04L 63/0428* (2013.01); *H04L 63/062* (2013.01)

(58) Field of Classification Search
CPC ..... H04L 9/083; H04L 9/3263; H04L 63/062; H04L 63/0823
See application file for complete search history.

(56) References Cited

U.S. PATENT DOCUMENTS

| 8,213,620 | B1 | 7/2012 | Sussland et al. |
| 8,782,762 | B2 | 7/2014 | Krishnan et al. |
| 9,098,675 | B1* | 8/2015 | Roth ...................... G06F 21/00 |
| 9,167,050 | B2* | 10/2015 | Durazzo ............. H04L 63/0281 |

| 2007/0256116 | A1* | 11/2007 | Kerschbaum ....... G06F 21/6218 726/1 |
| 2007/0260875 | A1* | 11/2007 | Raghunath ................ H04L 9/32 713/156 |
| 2007/0288747 | A1* | 12/2007 | Kwan .................... H04L 9/0822 713/156 |
| 2008/0040775 | A1* | 2/2008 | Hoff ....................... H04L 63/062 726/1 |
| 2008/0189543 | A1* | 8/2008 | Parkinson ............... G06F 21/33 713/156 |
| 2008/0307486 | A1* | 12/2008 | Ellison .................. H04L 63/102 726/1 |

(Continued)

OTHER PUBLICATIONS

Boutaba, Raouf; Omari, Salima; Pal Singh Virk, Ajay; "SELFCON: An Architecture for Self-Configuration of Networks", Journal of Communications and Networks, vol. 3, Issue 4, Dec. 2001, pp. 317-323.*

(Continued)

*Primary Examiner* — Victor Lesniewski
(74) *Attorney, Agent, or Firm* — Ditthavong & Steiner, P.C.

(57) ABSTRACT

An approach is provided for managing the provisioning and sharing of data among common users of a data service. A provisioning platform associates a security certificate with a business unit based on the submission of a provisioning request. The provisioning platform also associating one or more keys for accessing the data from the data service with a data container of the data service, the business unit, a key manager associated with the business unit, or a combination thereof based on the generation of a policy for establishing the identity of the business unit, for controlling access to data associated with the business unit as maintained by a data service, or a combination thereof based on the security certificate.

20 Claims, 10 Drawing Sheets

(56) References Cited

U.S. PATENT DOCUMENTS

| | | | | |
|---|---|---|---|---|
| 2011/0197061 | A1* | 8/2011 | Chou | H04L 9/3265 713/156 |
| 2013/0061035 | A1* | 3/2013 | Hook | H04L 9/088 713/150 |
| 2014/0075501 | A1* | 3/2014 | Srinivasan | G06F 21/62 726/1 |
| 2014/0096270 | A1* | 4/2014 | Beckwith | G06F 21/6209 726/30 |
| 2014/0281505 | A1* | 9/2014 | Zhang | H04L 9/3268 713/158 |
| 2014/0282922 | A1* | 9/2014 | Iwanski | H04L 63/0428 726/5 |
| 2015/0200943 | A1* | 7/2015 | Pitre | H04L 63/102 726/1 |
| 2015/0207633 | A1* | 7/2015 | Ravindran | H04L 9/3247 713/176 |
| 2015/0310188 | A1* | 10/2015 | Ford | G06F 21/10 726/28 |
| 2016/0112208 | A1* | 4/2016 | Williams | H04L 9/3247 713/158 |

OTHER PUBLICATIONS

Arasteh, Majid; Amini, Morteza; Jalili, Rasool; "A Trust and Reputation-based Access Control Model for Virtual Organizations", 9$^{th}$ International ISC Conference on Information Security and Cryptology, Sep. 13-14, 2012, pp. 121-127.*

Gmocloud, "GlobalSign Launches Revolutionary SSL Deployment Technology for Web Hosts", Jul. 22, 2008, retrieved on Jun. 26, 2015 from http://ir.gmocloud.com/english/news/080722_1692.html, 2 pages.

Bandi, "Harness Self Service Cloud Provisioning to Automate & Accelerate Multi-cloud Infrastructure Configuration", Automation & Orchestration, Jun. 9, 2014, retrieved on Jun. 26, 2015 from http://www.ostrato.com/blog/automation-orchestration/, 7 pages.

Hydrantid, "Enterprise Certificate Console Simplified Control for Digital Certificates from the Cloud", Aug. 7, 2013, retrieved on Jun. 26, 2015 from https://www.hydrantid.com/wp-content/uploads/2013/08 HydrandtID_Enterprise_Certificate_Console_8_7_13.pdf, 10 Pages.

* cited by examiner

100

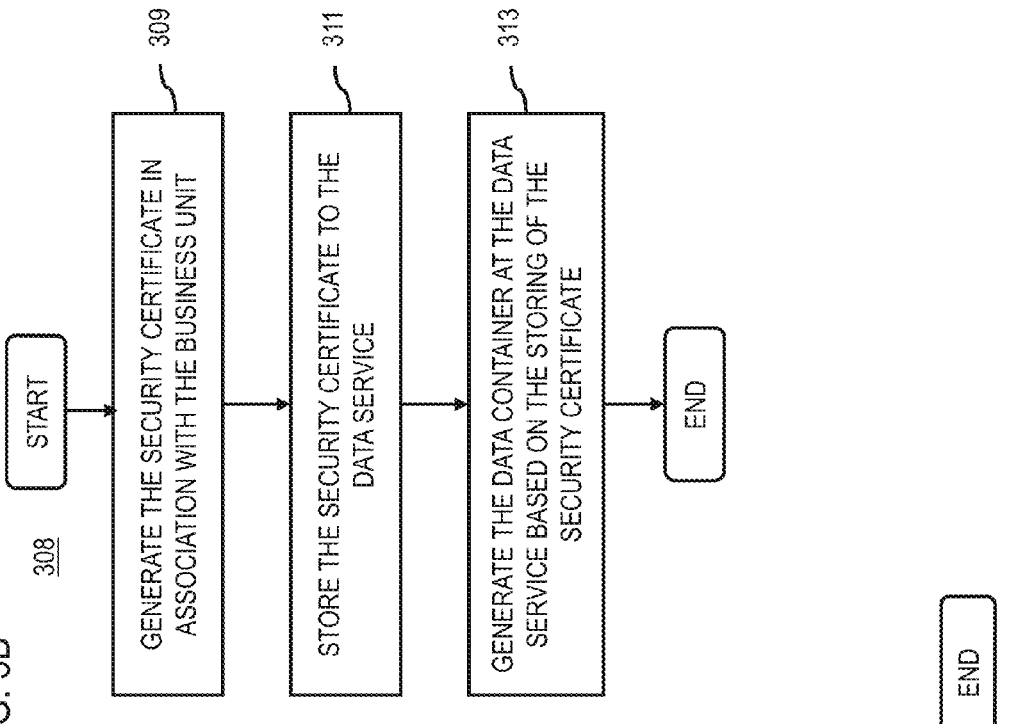
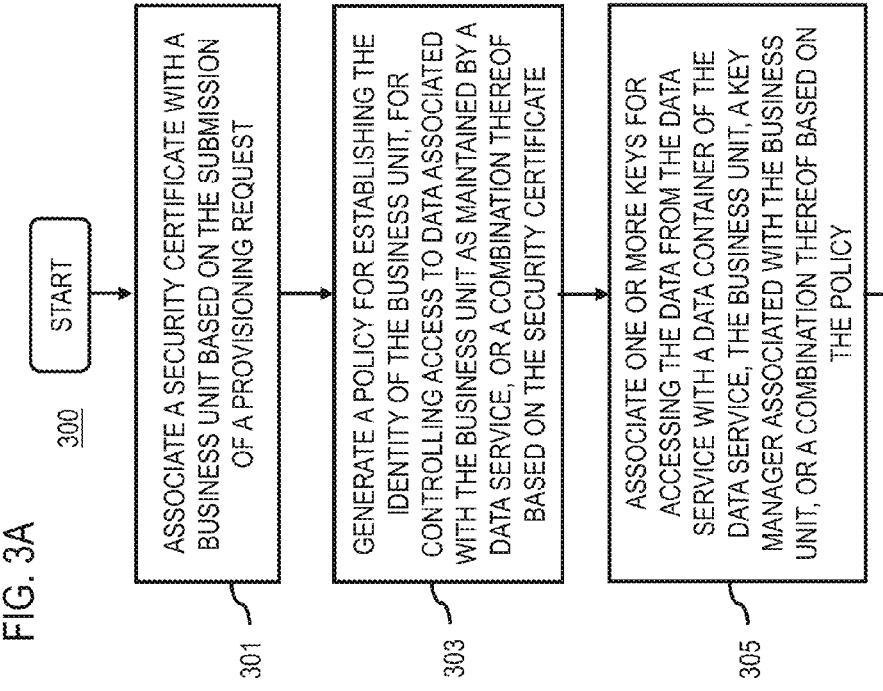

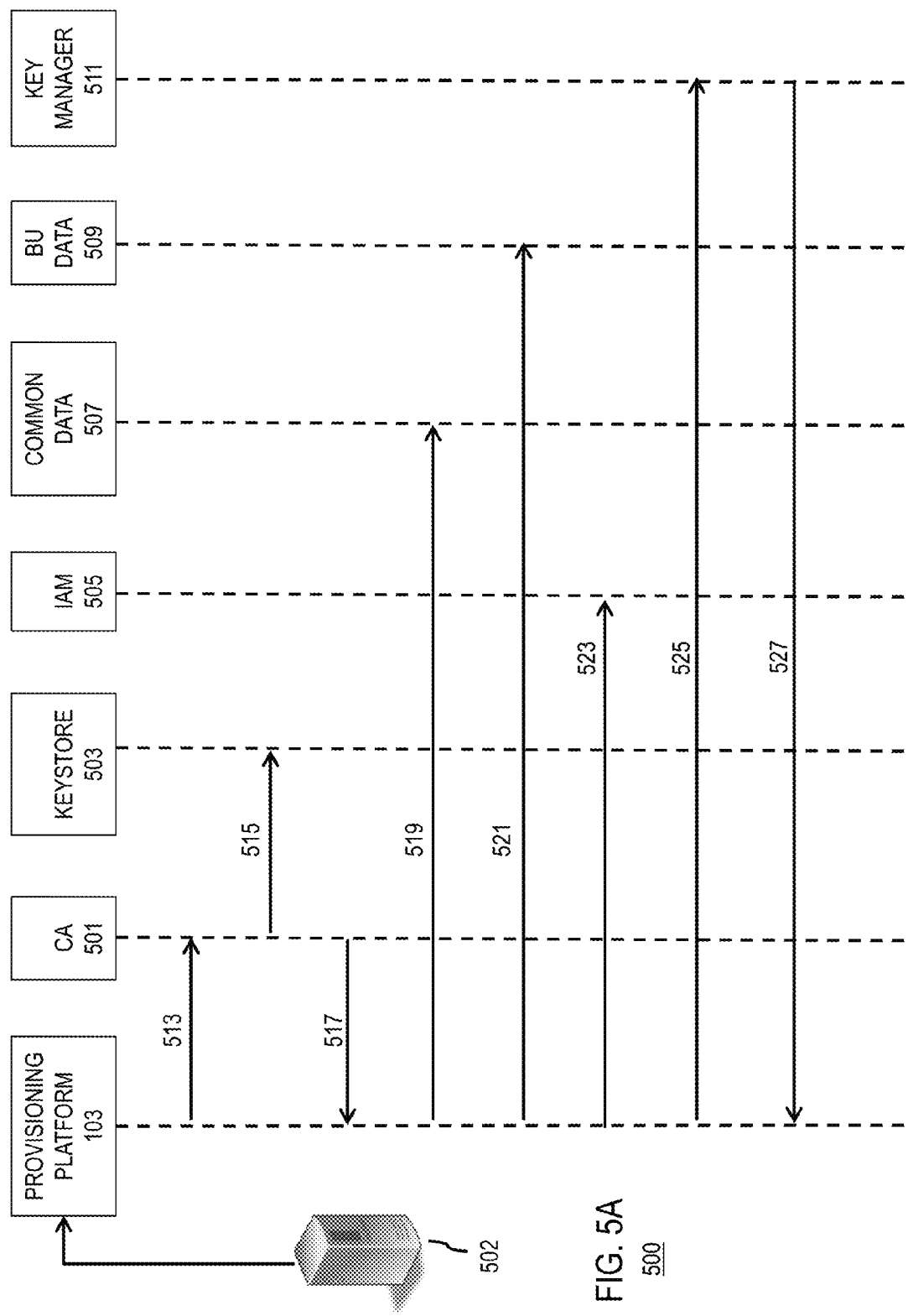

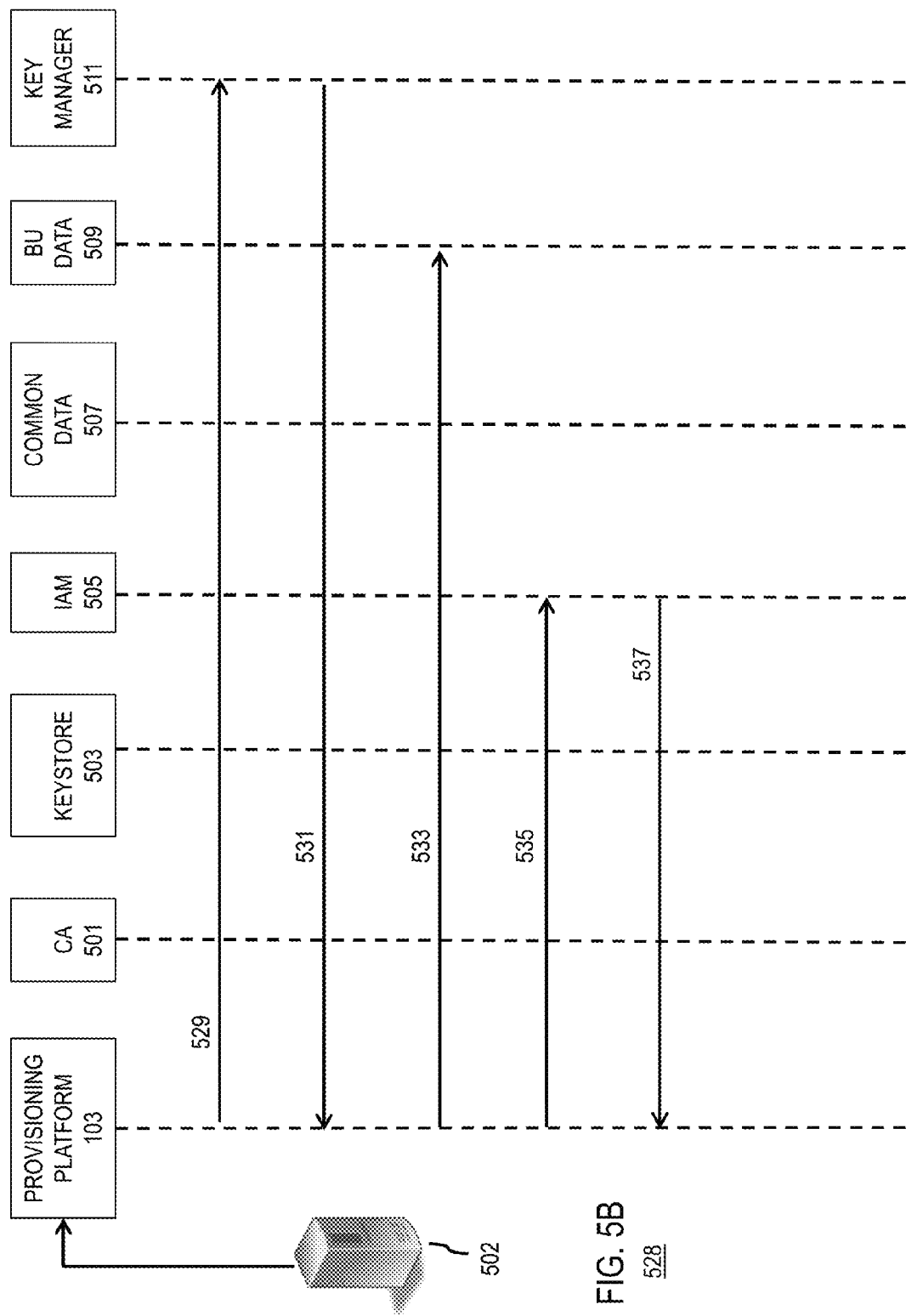

540

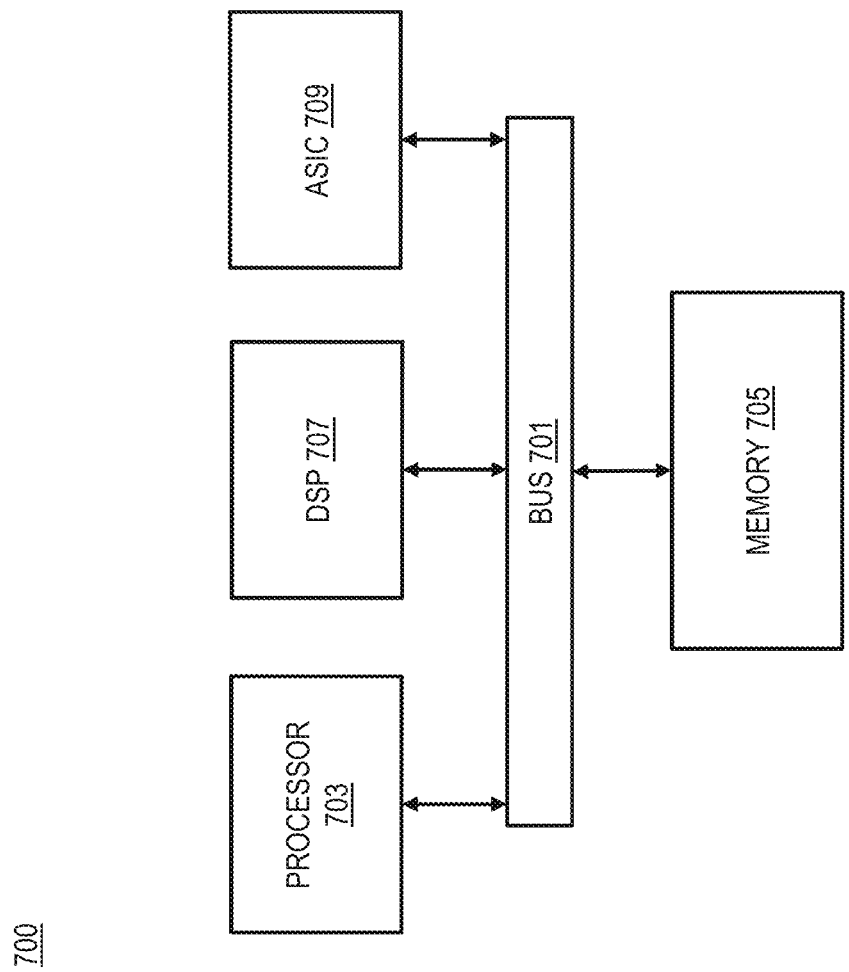

METHOD AND APPARATUS FOR MIGRATING ENCRYPTED DATA

BACKGROUND

Service providers and device manufacturers (e.g., wireless, cellular, etc.) are continually challenged to deliver value and convenience to consumers by, for example, providing compelling network services. One area of interest has been facilitating the provisioning of resources (e.g., devices, data, and systems) for use by authorized users. For example, a newly formed business unit within a company may need to be provisioned for access to one or more enterprise data stores, computing devices, etc. As another example, a mobile device of an employee may need to be provisioned for use over an enterprise network or in order to access various third-party resources associated with the employer. Unfortunately, the multitude of steps required to be performed for effectively provisioning a business unit can be time consuming; especially when there are large amounts of data and/or resources to be provisioned. This problem is further compounded in the case where some or all of the data required to be provisioned to a requesting party is stored remotely due to data security and user authentication concerns.

SOME EXAMPLE EMBODIMENTS

Therefore, there is a need for an approach for managing the provisioning and sharing of data among common users of a data service.

According to one embodiment, a method comprises associating a security certificate with a business unit based on the submission of a provisioning request. The method also comprises generating a policy for establishing the identity of the business unit, for controlling access to data associated with the business unit as maintained by a data service, or a combination thereof based on the security certificate. The method further comprises associating one or more keys for accessing the data from the data service with a data container of the data service, the business unit, a key manager associated with the business unit, or a combination thereof based on the policy.

According to another embodiment, an apparatus comprises at least one processor, and at least one memory including computer program code for one or more computer programs, the at least one memory and the computer program code configured to, with the at least one processor, cause, at least in part, the apparatus to associate a security certificate with a business unit based on the submission of a provisioning request. The apparatus is also caused to generate a policy for establishing the identity of the business unit, for controlling access to data associated with the business unit as maintained by a data service, or a combination thereof based on the security certificate. The apparatus is further caused to associate one or more keys for accessing the data from the data service with a data container of the data service, the business unit, a key manager associated with the business unit, or a combination thereof based on the policy.

According to another embodiment, a computer-readable storage medium carries one or more sequences of one or more instructions which, when executed by one or more processors, cause, at least in part, an apparatus to associate a security certificate with a business unit based on the submission of a provisioning request. The apparatus is also caused to generate a policy for establishing the identity of the business unit, for controlling access to data associated with the business unit as maintained by a data service, or a combination thereof based on the security certificate. The apparatus is further caused to associate one or more keys for accessing the data from the data service with a data container of the data service, the business unit, a key manager associated with the business unit, or a combination thereof based on the policy.

According to another embodiment, an apparatus comprises means for associating a security certificate with a business unit based on the submission of a provisioning request. The apparatus also comprises means for generating a policy for establishing the identity of the business unit, for controlling access to data associated with the business unit as maintained by a data service, or a combination thereof based on the security certificate. The apparatus further comprises means for associating one or more keys for accessing the data from the data service with a data container of the data service, the business unit, a key manager associated with the business unit, or a combination thereof based on the policy.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the user device side or in any shared way between service provider and user device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A and 3B and 4A-4C are flowcharts of processes for managing the provisioning and sharing of data among common users of a data service, according to various embodiments;

FIGS. 5A-5C are ladder diagrams for depicting the interaction of the exemplary elements of the system of FIG. 1, according to one embodiment;

FIG. 7 is a diagram of a chip set that can be used to implement an embodiment of the invention; and

DESCRIPTION OF SOME EMBODIMENTS

Examples of a method, apparatus, and computer program for managing the provisioning and sharing of data among common users of a data service according to one embodiment are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "provisioning" refers to any procedure for allocating, initiating, transferring or otherwise configuring a user, a group or a system for use of a resource. For the purpose of illustration herein, this may include the conveying of data assets of an enterprise to authorized users or groups.

Figure 1:
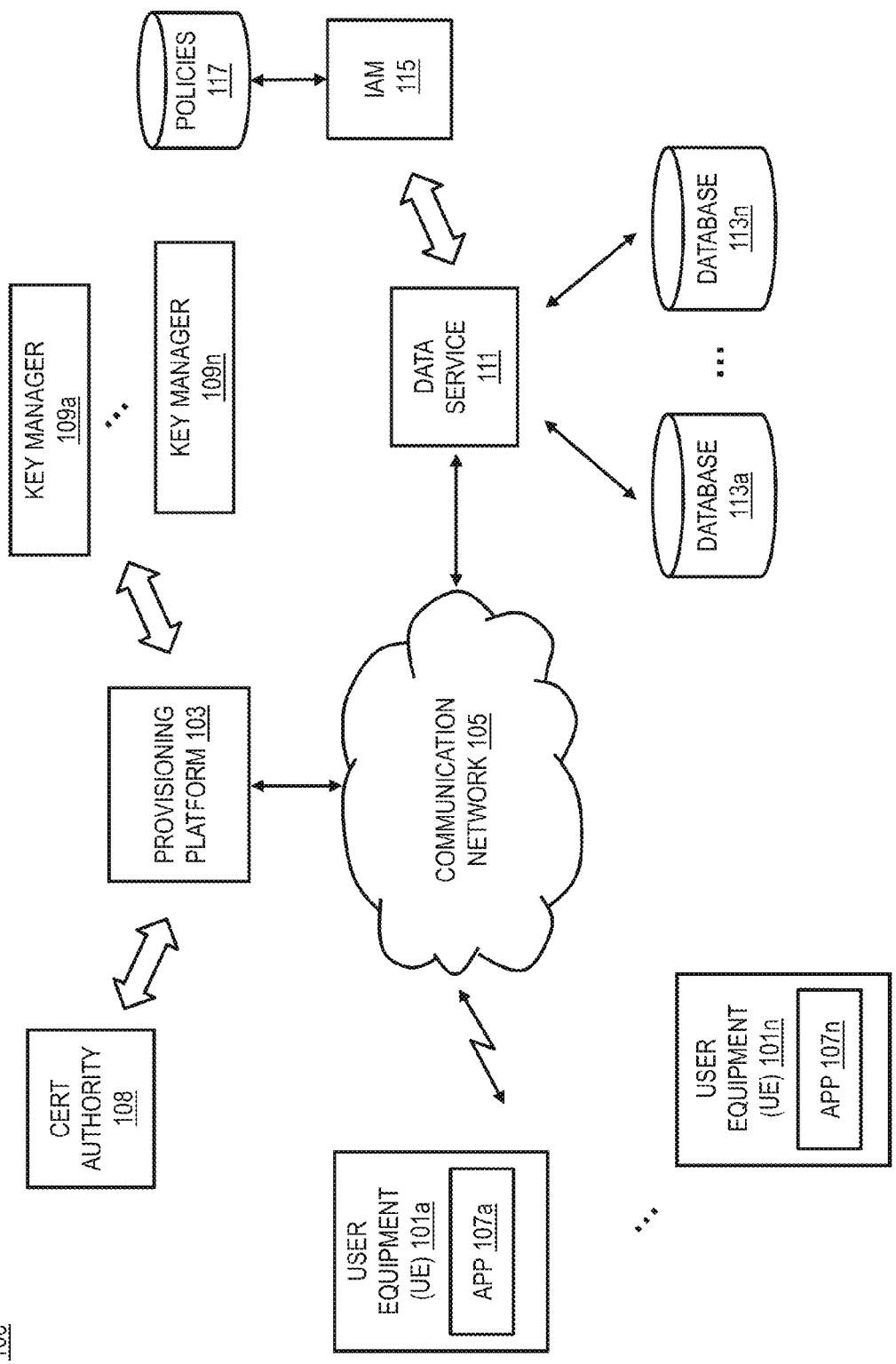
FIG. 1 is a diagram of a system for managing the provisioning and sharing of data among common users of a data service, according to one embodiment.

FIG. 1 is a diagram of a system for managing the provisioning and sharing of data among common users of a data service according to one embodiment. In one embodiment, the system 100 includes a provisioning platform 103 that is configured to interact with a data service 111. The data service 111 may be an enterprise or third-party resource, a web service, a server cluster or any other storage solution for maintaining large amounts of data on behalf of a user. For example purposes herein, the data service 111 may be directly or indirectly managed and/or implemented by the user. Hence, the exemplary embodiments herein contemplate both managed or subscriber based database data services 111.

As noted previously, enterprises may store some of their vital data assets to a remote data service 111. Typically, access to this data is limited to only those users or groups that have authorized access within the enterprise. For example, a marketing department of the enterprise may have access to mission critical marketing data, personnel files and client files while a sales department of the same enterprise may not. Under this scenario, when the sales department (e.g., a business unit comprising one or more users) needs to be provisioned for use of the aforementioned resources, the provisioning task can be a cumbersome process. Unfortunately, the multitude of steps required to be performed for effectively provisioning a business unit can be time consuming; especially when there are large amounts of data and/or resources to be provisioned. Typically, different scripts must be run at different stages in order to facilitate the provisioning, including defining the entity for use of the data, establishing the necessary security and access credentials, managing the level of access and/or control of individual users of the business unit to specific datasets, etc. Still further, given that the assets are remotely managed (e.g., via a cloud-based service), network access, security and data encryption/decryption measures must be appropriately managed in order to ensure successful conveyance and/or access to the data. There is currently no convenient mechanism for enabling the provisioning of data assets across an enterprise or for select groups while also ensuring the configuring of the various subsystems required for access/use of the data.

To address this problem, a system 100 of FIG. 1 introduces an automated process that enables seamless execution of the primary tasks required to provision resources maintained by a data service 111 In one embodiment, the provisioning platform 103 may be configured as a hosted solution, as an operating component of UE 101a-101n, or a combination thereof for performing one or more of the following tasks: (1) generating digital certificates for authenticating users or groups thereof for trusted access to a data service; (2) supporting the generation and management of the required encryption and decryption keys and credentials for supporting network security and user authentication; (3) defining a business unit/group for accessing the data; (4) specifying the specific datasets to be provisioned to a defined business unit; (5) facilitating the sharing of data amongst defined business units; and (6) automating the aforementioned steps to reduce the amount of time and effort required for fulfilling a request to provision one or more resources. In addition, the provisioning platform 103 may execute various application programming interfaces (APIs) for facilitating interaction with the data service 111 accordingly as well as applications 107a-107n of the UE 101a-101n for performing the aforementioned executions.

In one embodiment, the UE 101a-101n, referred to herein collectively as UE 101, may be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

The UE 101 may enable network connectivity to the provisioning platform 103 via a communication network 105. In addition, the UE 101 may operate applications 107a-107n, referred to herein as application 107, for initiating the submission of job requests to the provisioning platform 103. The job requests may specify one or more instructions, procedures or criteria to be carried out for migrating a set of data. This may include, for example, a specification of the name and/or location of the source database and the target database, the location of the data and/or reference information for the data within the source database, data quantity or type information, unique key information or a combination thereof. Additional conditions and/or constraints may also be specified, including bandwidth usage limits, time of completion limits, etc.

In one embodiment, the provisioning platform 103 receives and processes provisioning requests submitted via the application 107 of UE 101. By way of example, the provisioning requests may be submitted in the form of a request to provision a business unit for use of and/or access to the data 113. Alternatively, the provisioning request may be submitted in the form of a request for use and/or access to specific datasets (e.g., data objects). The request may further specify requirements for enabling the provisioning, including a name, identifier or other information related to the requesting user or business unit. In addition, the request may specify a particular data object to be provisioned.

It is noted that the provisioning platform 103 may also maintain an execution queue for managing the order and/or priority of execution of provisioning requests. This corresponds to an execution of multiple provisioning requests across an enterprise relating to data assets maintained by a common data service. Under this scenario, provisioning requests may be queued by the provisioning platform 103 based on the requirements as well as the current availability and resource and processing capabilities of the servers, databases, etc., involved in the migration. As such, a job pool may be maintained by the provisioning platform 103 for scheduling and coordinating the execution of all of the provisioning requests submitted by users of different UE 101.

In one embodiment, the provisioning platform 103 may further interact with one or more key management systems (KMS) for generating and managing one or more digital certificates. The digital certificates may be generated for the purpose of authenticating a user that submitted a request for provisioning a business unit. Under this scenario, the digital certificate may be generated as a public key certificate for use in indicating ownership of a public key. The digital certificate may specify information about the key, information about the identity of the user/business unit, a digital signature of an entity that has verified the certificate's contents are correct, etc. In this case, when the signature is determined valid and the data service 111 that receives the certificate validates its trust of the signer, a provisioning request may be carried out accordingly.

It is noted that in a public-key infrastructure (PKI) scheme, the signer of the digital certificate is a certificate authority (CA) 108. The certificate authority 108 is a service company that issues certificates (e.g., Comodo, DigiCert) for use in performing cryptographic certification. Certificates may be used within the context of a Transport Layer Security (TLS) or Secure Sockets Layer (SSL) scheme, wherein the certificate is stored to a keystore in association with a private key (decryption) in addition to the specified public key (encryption key). The embodiments herein contemplate any known protocols, methods and approaches for generating digital certificates and other authentication records.

Under this scenario, once the digital certificate is generated, it is stored to the data service 111 in connection with the requesting business unit. This may include storing the digital certificate to a common data container, folder, directory or other section of the repository maintained by the data service 111 for the enterprise that owns the data assets. Per this approach, the digital certificate for the business unit may be subsequently recognized in connection with the enterprise. Also, the provisioning platform 103 initiates the generation of a common data container, folder, directory or the like specifically associated with the business unit. In the case where the business unit is an engineering group, for example, the data container will be generated exclusively for storing data objects for this group.

The digital certificate may specify pertinent details regarding the requesting user/business unit. An example of the different information is shown below in Table 1:

TABLE 1

Serial Number: Used to uniquely identify the certificate.
Subject: The person, or entity identified (e.g., business unit).
Signature Algorithm: The algorithm used to create the signature.
Signature: The actual signature to verify that it came from the issuer.
Issuer: The entity (CA 108) that verified the information and issued the certificate.
Valid-From: The date the certificate is first valid from.
Valid-To: The expiration date.
Key-Usage: Purpose of the public key (e.g., encipherment, signature, certificate signing, etc.).
Public Key: The public key.
Thumbprint Algorithm: The algorithm used to hash the public key certificate.
Thumbprint (also known as fingerprint): The hash itself, used as an abbreviated form of the public key certificate.

Once the certificate is stored in association with the enterprise or business unit thereof, policies for affecting the provisioning of assets to the business unit must be defined. In one embodiment, the provisioning platform 103 operates in connection with an Identity and Access Management (IAM) system 115. The IAM system 115 may be associated with the data service 111 for generating and enforcing one or more access and control policies. The policies 117 may define the level and type of access the requesting business unit has to the data 113 at the data service 111. The IAM system 115 processes the provisioning request as passed onto it by the provisioning platform 103 in order to determine any business unit specified requirements. In addition, the IAM system 115 may determine which users, groups and use permissions to allow and deny based on the provisioning request. It is noted, however, that the IAM system 115 may override any permissions or access requirements specified per the request in lieu of any established constraints set forth by the enterprise.

In one embodiment, the provisioning platform 103 then stores the information regarding the requesting business unit to a key manager 109. Under this scenario, the key manager 109 serves as a key repository for storing master keys that allows authorized users to access the data 113. The provisioning platform 103 also maintains a data map at the KMS for specifying the private keys that are associated with the business unit. As will be discussed later on herein, the data map may be used to support the access and sharing of data between different business units, the one or more other business units, or a combination thereof and the public key specifies data for indicating a prefix of the business unit, the one or more other business units, or a combination thereof.

In another embodiment, the provisioning platform 103 responds to a request to provision data by generating one or more cryptographic keys for defining access of the requesting user or business unit. This includes generating a key pair in as—i.e., a public and private key—with the business unit based on the provisioning request. The provisioning platform 103 also stores a public key to the data container of the business unit in response to receipt of a master key from the key manager based on authentication of the private key pair. It is noted, therefore, that access to a data set is preceded by an authentication/verification process. Once performed, the provisioning platform 103 then proceeds to define the policies to associate with the business unit, resulting in completion of the provisioning process.

In one embodiment, the provisioning platform 103 enables the sharing of data objects associated with one business unit provisioned/configured for access with the data service 111 with another requesting business unit. By way of example, when a sharing request is received, the platform 103 interacts with the IAM system 115 to generate a policy 117 for specifying access of the requesting business unit to the data maintained per the database 113. Once established, the provisioning platform 103 generates a record for indicating permission of the requesting business unit to access a dataset of another business unit. This record is then stored along with an updated data map (for mapping specific data sets to specific keys) to the key manager 109.

It is noted that the provisioning platform 103 may be implemented to operate in connection with any known data services 111 (e.g., Amazon S3, Google Cloud Storage, and Rackspace Cloud Storage). Furthermore, the provisioning platform 103 may operate in accordance with any known database architectures/models—i.e., to accommodate different data object types, storage types, naming conventions, definitions, etc. As such, the provisioning platform 103 may support the provisioning of data conforming to different types or data models.

The communication system 105 of system 100 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UE 101, provisioning platform 103 and cluster based service 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
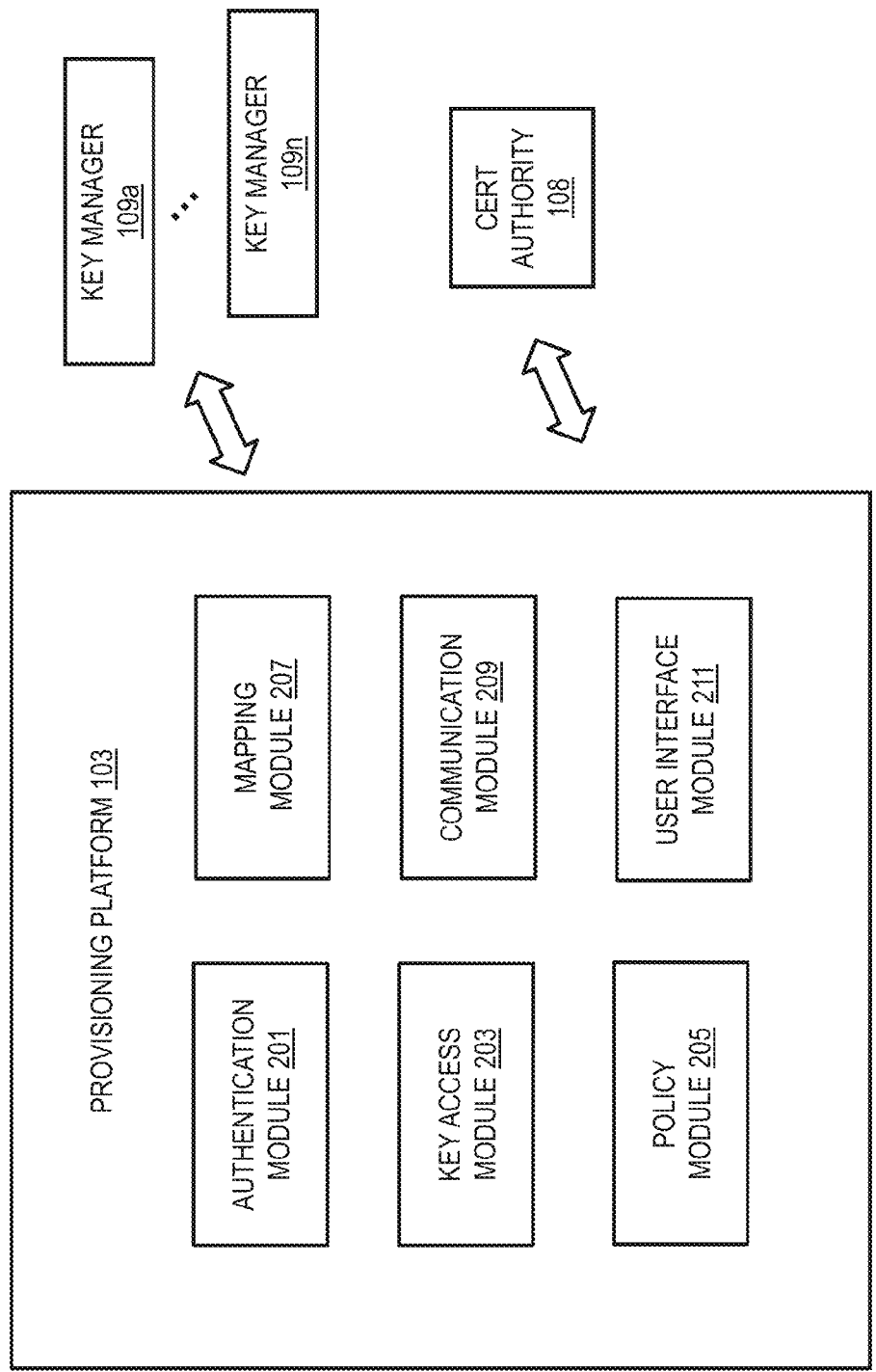
FIG. 2 is a diagram of the components of a provisioning platform, according to one embodiment.
Figure 4B:
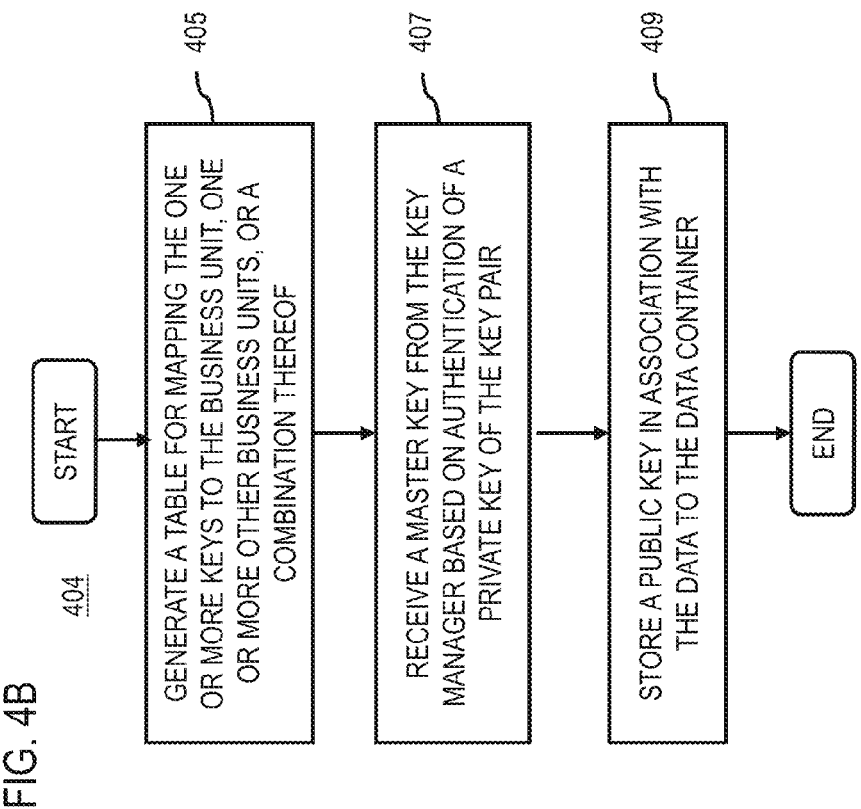
Figure 4A:
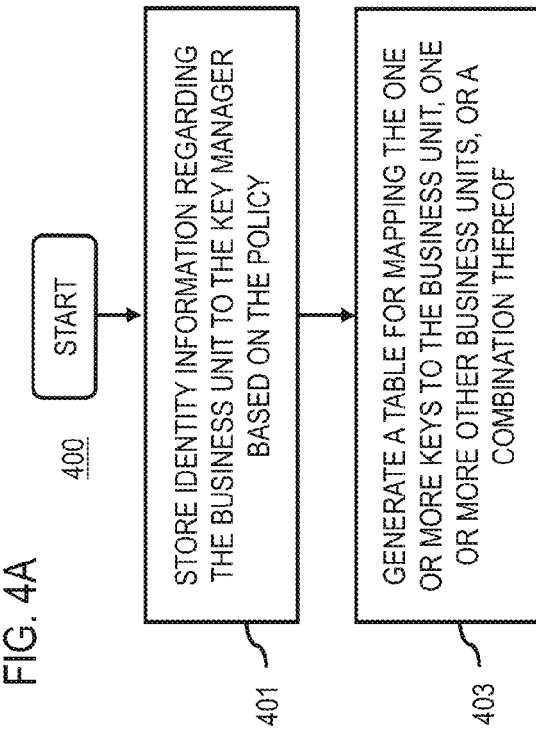
Figure 4C:
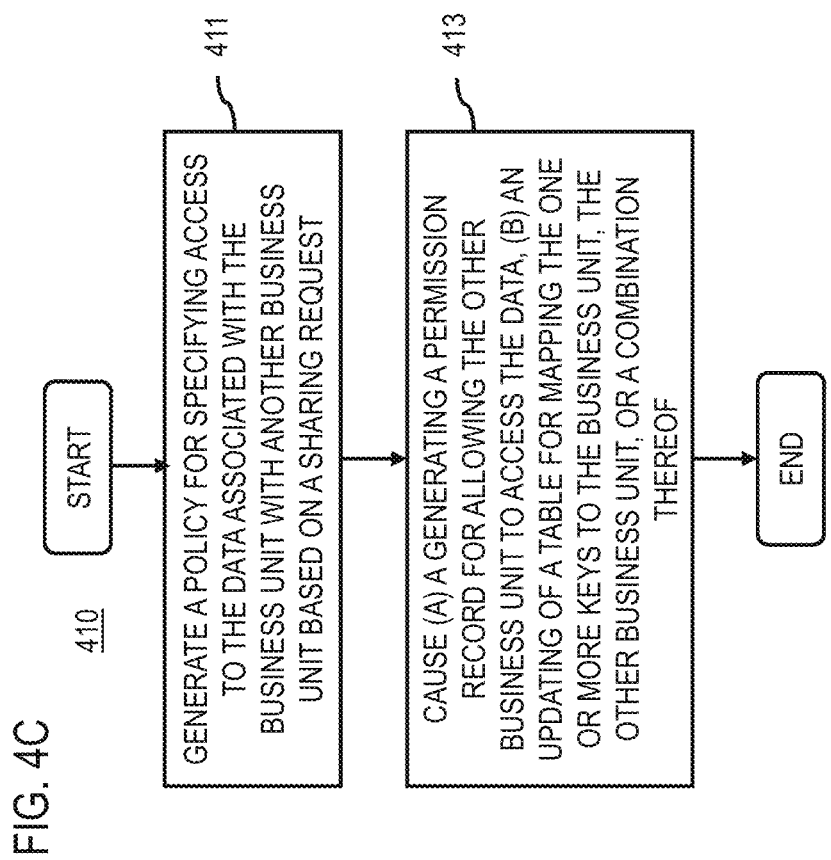

FIG. 2 is a diagram of the components of a provisioning platform, according to one embodiment. By way of example, the provisioning platform 103 includes one or more components for managing the provisioning and sharing of data among common users of a data service. It is contemplated that the functions of these components may be combined in one or more components or performed by other components of equivalent functionality.

An authentication module 201 authenticates users/groups/business units and UE 101 for interaction with the provisioning platform 103. In the case of an initial accessing of the provisioning platform 103, a registration procedure may be performed. The registration may include facilitating the downloading of the application 107 to the UE of the user. Furthermore, the registration may include the establishment of a digital certificate for association with the user. Under this scenario, the authentication module 201 may interact with the certificate authority 108 via the communication module 209 for validating/entrusting the digital certificate as generated.

The authentication module 201 may also receive a job request involving the provisioning. Under this scenario, the authentication module determines the request type as a business unit provisioning request, a data provisioning request or a request to share stored information between respective business units of data from a source database to a target database. Requests may be received from the application 107 and submitted by the authentication module 201 to the policy module 205 in order to determine the requirements, parameters, instructions and/or constraints set forth per the request. This may include, for example, the name of a business unit to be provisioned, an identification of a specific data object to access, an identifier associated with another business unit from which to access data objects, etc.

A key access module 203 operates in connection with the communication module 209 to retrieve keys from the key manager 109. The key managers 109 may be a service utilized by the user for maintaining encryption keys generated for use by requesting programs and applications. Under this scenario, the keys are requested by the key access module 203 in response to the execution of a migration task/job request by the execution module 207. In addition to retrieving keys, the key access module 203 may be called upon by the authentication module 207 to generate keys, such as in the case where a business unit must be provisioned/defined for access to the data service 111. Furthermore, the key access module 203 may be called upon by the execution module 207 to decrypt keys, such as in the case where an envelope key for encompassing a data object is to be decrypted utilizing a master key associated with a key manager 109.

A policy module 205 triggers execution of the identity and access module (IAM) system 115 associated with the data service 111. By way of example, the policy module 205 initiates the generation of a policy for defining the access of the business unit to the data service 111. Still further, the policy module 205 initiates the generation of a policy for defining the access of a specific dataset of a particular business unit. The IAM system 115 may perform one or more of the following:

1. Manage users/business units and their access—IAM system 115 can create users, assign them individual security credentials (in other words, access keys, passwords, and multi-factor authentication devices), or request temporary security credentials to provide users/business units access to specific data.
2. Manage user/business unit roles and permissions—JAM system 115 can create roles and manage permissions to control which operations can be performed by the enterprise or data service 111.
3. Manage federated users and their permissions—JAM system 115 can enable identity federation to allow existing identities (e.g. users/business units) within the enterprise to access the data service 111, call application programming interfaces (APIs) associated with the data service 111 and to access data objects without the need to create an JAM user for each identity.

It is noted, in certain implementations, that the policy module 205 may perform some or all of the above executions depending on the capabilities of the data service 111.

A mapping module 207 maintains a data map for linking the various data objects stored for the enterprise of specific business unit to their associate cryptographic key. The mapping module operates in connection with the communication module 209 in order to store the data map with a key manager 109 serving as a key repository. Per this approach, the specific private keys and decryption keys for a given dataset may be readily identified. In the case where a share request is received via the authentication module 201, the mapping module 207 may be summoned to retrieve the appropriate key for facilitating the data sharing request. The data map is also updated accordingly as additional datasets are stored to the data service 111 or as additional business units are introduced. It is noted that the data map may be maintained as a relational data table, as metadata, or a combination thereof.

A communication module 209 enables formation of a session over a network 105 between the provisioning platform 103 and the application 107, the key manager 109 and the data service 111. By way of example, the communication module 213 executes various protocols and data sharing techniques for enabling collaborative execution between a UE 101 (e.g., mobile devices, laptops, smartphones, tablet computers, desktop computers) and the provisioning platform 103 over the network 105. Still further, the communication module 211 may be configured to retrieve application programming interfaces and other data tools required for enabling the provisioning platform to interact with a specific data service.

A user interface module 211 enables presentment of a graphical user interface for interacting with the provisioning platform via the UE 101. Under this scenario, the user interface may include various user controls, i.e., buttons, menus and data entry options, for enabling a user of UE 101 to submit requests. The user interface module 215 may interact with the communication module 209 for supporting the generation and display of graphics primitives, the submission of input, etc., via the application 107.

The above presented modules and components of the provisioning platform 103 can be implemented in hardware, firmware, software, or a combination thereof. While the provisioning platform 103 may be implemented as a platform or hosted for interacting with UE 101, it is also contemplated that it may be implemented for direct operation by respective UE 101a-101n. Per this approach, some of the executions of the above described components may be performed at the UE 101a-101n, wherein the provisioning platform 103 generates direct signal inputs by way of the operating system of the UE 101 for interacting with the data service. The exemplary embodiments herein may correspond to any of these implementations.

Figure 6:
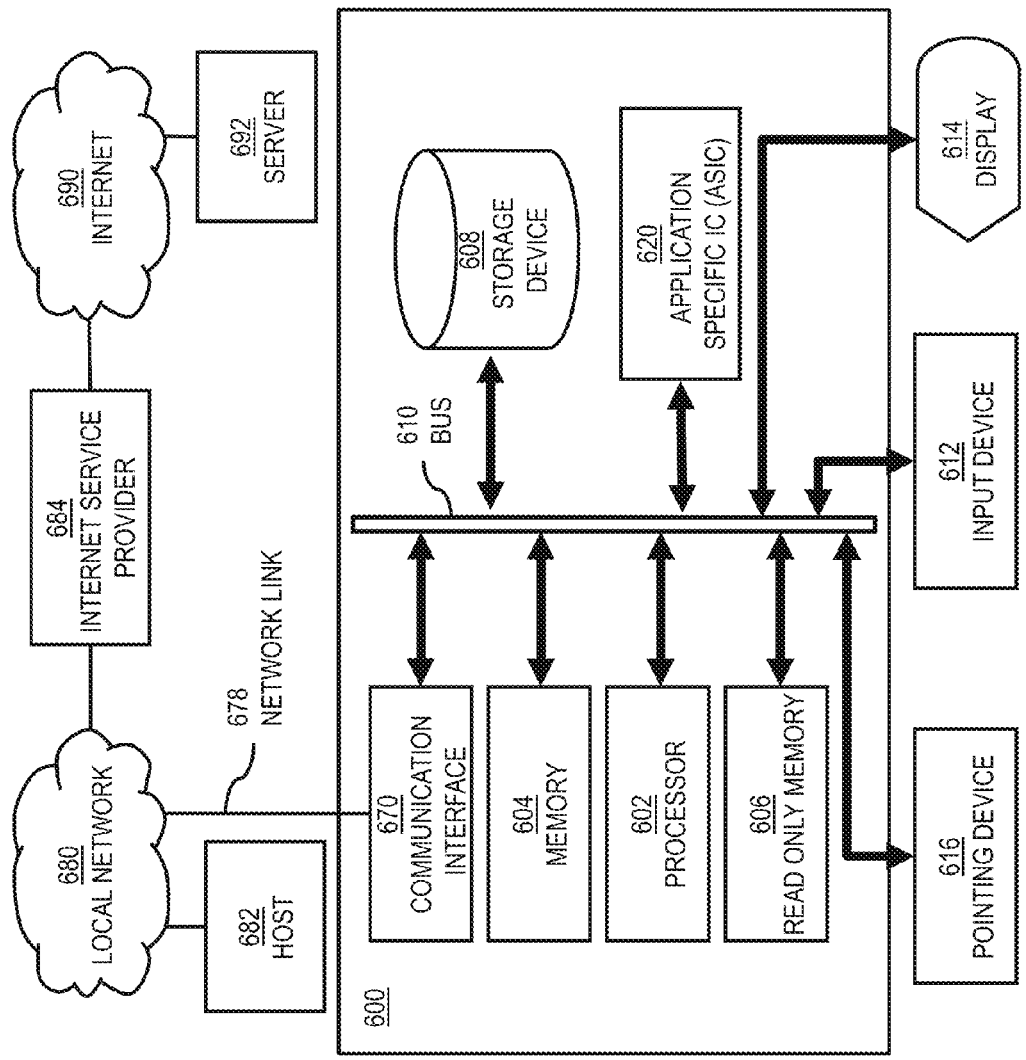
FIG. 6 is a diagram of hardware that can be used to implement an embodiment of the invention.

FIGS. 3A and 3B and 4A-4C are flowcharts of processes for managing the provisioning and sharing of data among common users of a data service, according to various embodiments. In one embodiment, the provisioning platform 103 performs the processes and is implemented in, for instance, a chip set including a processor and a memory as shown in FIG. 6.

In step 301 of process 300 (FIG. 3A), the provisioning platform 103 associates a security certificate with a business unit based on the submission of a provisioning request. In step 303, the platform 103 generates a policy for establishing the identity of the business unit, for controlling access to data associated with the business unit as maintained by a data service, or a combination thereof based on the security certificate. As noted previously, the policy may be established per the execution of an identity and access management (IAM) service 115 associated with the data service 111.

In step 306, the provisioning platform 103 associates one or more keys for accessing the data from the data service with a data container of the data service, the business unit, a key manager associated with the business unit, or a combination thereof based on the policy. In another step 308, the platform 103 determines fulfillment of the provisioning request based on the association of the one or more keys.

In steps 309 and 311 respectively of process 308 (FIG. 3B), the provisioning platform 103 generates the security certificate in association with the business unit and stores the security certificate to the data service 111. In another step 313, the platform 103 generates the data container at the data service 111 based on the storing of the security certificate. As noted previously, the data container maintains one or more data objects and the data objects include (a) the data associated with the business unit, (b) at least one a key associated with the data, or (c) a combination thereof.

In step 401 of process 400, the provisioning platform 103 stores identity information regarding the business unit to the key manager based on the policy. As noted, the key manager stores at least one of the one or more keys for authenticating the business unit for access to the data service, the data to be provisioned, or a combination thereof. In another step 403, the platform 103 generates a table for mapping the one or more keys to the business unit, one or more other business units, or a combination thereof. The table is maintained by the key manager and the associating of the one or more keys is based on the table.

In step 405 of process 404 (FIG. 4B), the provisioning platform 103 generates a key pair in association with the business unit based on the provisioning request. In another step 407, the platform 103 receives a master key from the key manager based on authentication of a private key of the key pair. Per step 409, the platform 103 stores a public key in association with the data to the data container. It is noted that the table specifies at least the private key associated with the business unit, the one or more other business units, or a combination thereof. Also, the public key specifies data for indicating a prefix of the business unit, the one or more other business units, or a combination thereof.

In step 411 of process 410 (FIG. 4C), the provisioning platform 103 generates a policy for specifying access to the data associated with the business unit with another business unit based on a sharing request. In another step 413, the platform 103 causes (a) a generating a permission record for allowing the other business unit to access the data, (b) an updating of a table for mapping the one or more keys to the business unit, the other business unit, or a combination thereof. Under this scenario, the permission record, the table, or a combination thereof is maintained by the key manager. Fulfillment of the sharing request is based on the generation of the permission record, the updating of the table, or a combination thereof.

Figure 5C:
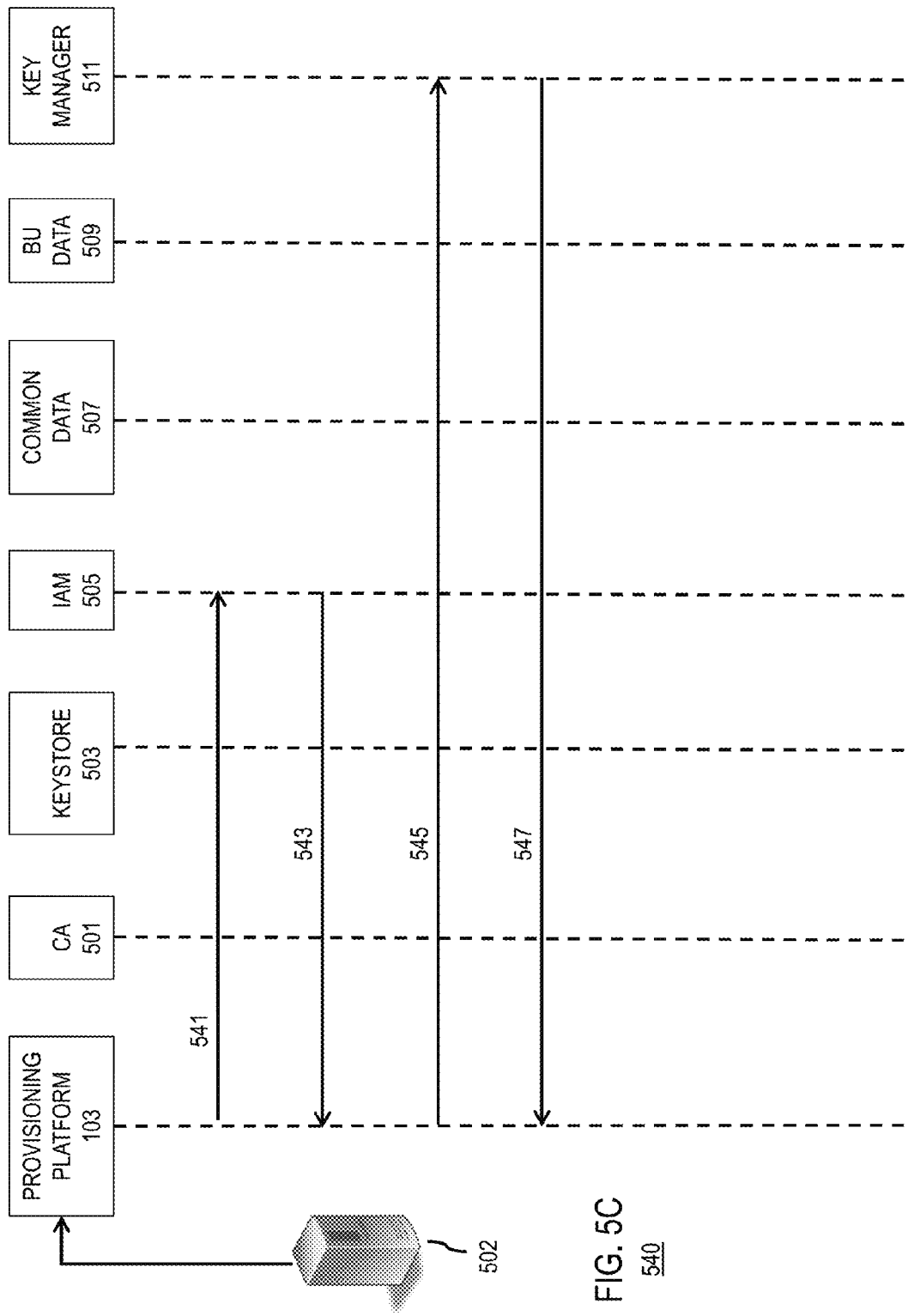

FIGS. 5A-5C are ladder diagrams for depicting the interaction of the exemplary elements of the system of FIG. 1, according to one embodiment. The elements of the system include, for example, the provisioning platform 103, a certificate authority (CA) 501 and an associated keystore 503. Also included is an identity and access management system 505, a common data container (e.g., bucket or folder) 507, a dedicated business unit container 509 and a key management system (key manager 511). A server device 502 is configured to interact with the provisioning platform 103 by way of an application for submitting provisioning requests.

In FIG. 5A, the interaction between respective elements of the system includes steps 513-527 for provisioning a business unit. Once a request is submitted per server 502, the provisioning platform 103 requests generation of a new digital certificate for the requesting business unit, corresponding to step 513. This includes performing trust verification via the certificate authority (CA) 501. It is noted that the certificate may be generated per SSL, TTL or any other known protocol. In another step 515, the provisioning platform 103 generates and adds the new client certificate to the keystore 503. The certificate is then returned to the provisioning platform 103 as generated per step 517.

In step 519, the platform 103 stores the new digital certificate associated with the business unit to the common data container 507. In addition, a container 509 is generated expressly for the business unit per step 521, signifying recognition of the business unit as being a viable user of the data assets of the enterprise. Per step a request to retrieve the decryption key from the original key manager 503. By way of example, the request may be initiated as a REST API call for transmission as a hypertext transfer protocol message. The key manager 503 then returns the key as requested, per step 523.

In step 525, the provisioning platform 103 inserts the newly defined business unit information in the data mapping record. This includes storing the information to the key manager 511. Per step 527, the platform 103 indicates fulfillment of the business unit provisioning request by indicating successful completion of the storing of the business information.

In FIG. 5B, the interaction between respective elements of the system includes steps 529-537 for provisioning data in association with a business unit. Once a request is submitted per server 502, the provisioning platform 103 generates a new encryption key pair, per step 529. In addition, persistent encryption is performed based on the private key and information regarding the dataset to be provisioned is stored to the key manager 511. In another step 531, the newly defined dataset, master key and business unit dataset permission information is returned to the provisioning platform 103. The permission information pertains to the data map for indicating the linkages between respective datasets and the private keys. Permission mapping between business units supports cross-referencing of datasets across the enterprise and different business units.

In step 533, the platform 103 stores the public key associated with the dataset to the container 509 for the business unit. It is noted that the dataset may be stored to reference prefix information or other identifier data related to the business unit. Per step 535, the platform 103 established a policy for regulating access to the newly created dataset per IAM 505. Step 537 then specifies completion of the data provisioning request.

In FIG. 5C, the interaction between respective elements of the system includes steps 541-547 for sharing data between business units. Once a request is submitted per server 502, the provisioning platform 103 updates the policy associated with the dataset of a first business unit to enable read access, corresponding to step 541. This includes interacting with the IAM 505, which in turn, specifies that the read access permission is granted per the policy via step 543.

In another step 543, the platform 103 inserts the permission record for allowing a second business unit to access the dataset associated with the first business unit. This corresponds to an updating of the data map in association with the private key for the dataset per the key manager 511. Step 547 then specifies completion of the request.

The processes described herein for managing the provisioning and sharing of data among common users of a data service may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to manage the migration of large amounts of encrypted data as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of managing the migration of large amounts of encrypted data.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to manage the migration of large amounts of encrypted data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for managing the provisioning and sharing of data among common users of a data service. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for managing the provisioning and sharing of data among common users of a data service, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for managing the provisioning and sharing of data among common users of a data service to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to manage the migration of large amounts of encrypted data as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of managing the migration of large amounts of encrypted data.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to manage the migration of large amounts of encrypted data. The memory 705 also stores the data associated with or generated by the execution of the inventive steps.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for provisioning and sharing data among users of a data service, comprising:
receiving, by a processor, a provisioning request to provision a new business unit of an enterprise for access to a data service, wherein the new business unit comprises one or more of the users that belong to the enterprise, and the users that belong to the enterprise are previously assigned to one or more already existing business units, wherein the data service stores encrypted data owned by the enterprise, at least a portion of the encrypted data is accessible to the one or more of the users via the one or more already existing business units in one or more already existing data containers of the data service, and at least another portion of the encrypted data is to be associated with the new business unit in a new data container of the data service and to be accessible by the one or more of the users, wherein the new business unit and the new data container do not exist prior to the provisioning request, and the one or more of the users do not have access rights to the new data container prior to the provisioning request;
associating, by the processor, a security certificate with the new business unit based on the provisioning request;
determining, by the processor, the one or more of the users comprising the new business unit based on the provisioning request; and
in response to the provisioning request, automatically generating, by the processor, a policy for controlling access to the at least another portion of the encrypted data in the new data container by the one or more of the users of the new business unit based on the security certificate; and associating, by the processor, one or more keys for accessing the at least another portion of the encrypted data with the new data container of the data service, the new business unit, a key manager associated with the data service, or a combination thereof based on the policy.

2. A method of claim 1, further comprising:
determining fulfillment of the provisioning request based on the association of the one or more keys.

3. A method of claim 1, further comprising:
in response to the provisioning request, generating the security certificate in association with the new business unit; and storing the security certificate to a common data container of the data service,
wherein the common data container is a repository maintained by the data service for the enterprise that owns the new business unit and has access rights to the encrypted data prior to the provisioning request.

4. A method of claim 3, further comprising:
in response to the provisioning request, generating the new data container at the data service based on the storing of the security certificate in the common data container of the service,
wherein the new data container is generated as a business unit data container of the data service, and
wherein the new data container exclusively stores data associated with the new business unit.

5. A method of claim 1, further comprising:
storing identity information regarding the new business unit to the key manager based on the policy,
wherein the key manager stores at least one of the one or more keys for authenticating the new business unit for access to the data service, the encrypted data, or a combination thereof.

6. A method of claim 5, further comprising:
storing identity information regarding the one or more of the users of the new business unit to the key manager based on the policy,
wherein the key manager stores a subset of the one or more keys and authenticates the one or more of the users for access to the data service, the encrypted data, or a combination thereof.

7. A method of claim 6, wherein the one or more keys include a key pair comprising a public key and a private key generated per user for the one or more of the users of the new business unit for authentication, the method further comprising:
generating a table mapping the private key to a respective user and to the new data container,
wherein the table is stored at the key manager.

8. A method of claim 1, wherein the one or more keys include a key pair comprising a public key and a private key generated for authenticating the new business unit, the method further comprising:
generating a table mapping the private key to the new business unit and to the new data container,
wherein the table is stored at the key manager.

9. A method of claim 8, further comprising:
transmitting the private key to the key manager for authentication;
receiving a master key from the key manager based on the authentication of the private key of the key pair against the table,
wherein the master key is used to decrypt the encrypted data stored in the new data container.

10. A method of claim 9, further comprising:
receiving a sharing request to share the new data container, the encrypted data, or a combination thereof with one or more other business units; and
updating the table to map a private key of the one or more other business units to the new data container, the encrypted data, or a combination thereof, to fulfill the sharing request.

11. A method of claim 10, further comprising:
generating a permission record for allowing the one or more other business units to access the new data container, the encrypted data, or a combination thereof,
wherein the permission record, the table, or a combination thereof is maintained by the key manager.

12. A method of claim 11, wherein fulfillment of the sharing request is based on the generation of the permission record, the updating of the table, or a combination thereof.

13. An apparatus for provisioning and sharing data among users of a data service, comprising:
at least one processor; and
at least one memory including computer program code for one or more programs,
the at least one memory and the computer program code configured to, with the at least one processor, cause the apparatus to perform at least the following,
receive a provisioning request to provision a new business unit of an enterprise for access to a data service, wherein the new business unit comprises one or more of the users that belong to the enterprise, and the users that belong to the enterprise are previously assigned to one or more already existing business units, wherein the data service stores encrypted data owned by the enterprise, at least a portion of the encrypted data is accessible to the one or more of the users via the one or more already existing business units in one or more already existing data containers of the data service, and at least another portion of the encrypted data is to be associated with the new business unit in a new data container of the data service and to be accessible by the one or more of the users, wherein the new business unit and the new data container do not exist prior to the provisioning request, and the one or more of the users do not have access rights to the new data container prior to the provisioning request;
associate a security certificate with the new business unit based on the provisioning request;
determine the one or more of the users comprising the new business unit based on the provisioning request; and
in response to the provisioning request, automatically generate a policy for controlling access to the at least another portion of the encrypted data in the new data container by the one or more of the users of the new business unit based on the security certificate; and
associate one or more keys for accessing the at least another portion of the encrypted data with the new data container of the data service, the new business unit, a key manager associated with the data service, or a combination thereof based on the policy.

14. An apparatus of claim 13, wherein the apparatus is further caused to:
determine fulfillment of the provisioning request based on the association of the one or more keys.

15. An apparatus of claim 13, wherein the apparatus is further caused to:
in response to the provisioning request, generate the security certificate in association with the new business unit; and store the security certificate to a common data container of the data service,
wherein the common data container is a repository maintained by the data service for the enterprise that owns the new business unit and has access rights to the encrypted data prior to the provisioning request.

16. An apparatus of claim 15, wherein the apparatus is further caused to:
in response to the provisioning request, generate the new data container at the data service based on the storing of the security certificate in the common data container of the service,
wherein the new data container is generated as a business unit data container of the data service, and
wherein the new data container exclusively stores data associated with the new business unit.

17. An apparatus of claim 16, wherein the apparatus is further caused to:
store identity information regarding the new business unit to the key manager based on the policy,
wherein the key manager stores at least one of the one or more keys for authenticating the new business unit for access to the data service, the encrypted data, or a combination thereof.

18. An apparatus of claim 13, wherein the one or more keys include a key pair comprising a public key and a private key generated for authenticating the new business unit, and wherein the apparatus is further caused to:
generate a table mapping the private key to the new business unit and to the new data container,
wherein the table is stored at the key manager.

19. An apparatus of claim 18, wherein the apparatus is further caused to:
transmit the private key to the key manager for authentication;

receive a master key from the key manager based on the authentication of the private key of the key pair against the table, wherein the master key is used to decrypt the encrypted data stored in the new data container.

20. A non-transitory computer-readable storage medium for provisioning and sharing data among users of a data service, carrying one or more sequences of one or more instructions which, when executed by one or more processors, cause an apparatus to perform:

receiving a provisioning request to provision a new business unit of an enterprise for access to a data service, wherein the new business unit comprises one or more of the users that belong to the enterprise, and the users that belong to the enterprise are previously assigned to one or more already existing business units, wherein the data service stores encrypted data owned by the enterprise, at least a portion of the encrypted data is accessible to the one or more of the users via the one or more already existing business units in one or more already existing data containers of the data service, and at least another portion of the encrypted data is to be associated with the new business unit in a new data container of the data service and to be accessible by the one or more of the users, wherein the new business unit and the new data container do not exist prior to the provisioning request, and the one or more of the users do not have access rights to the new data container prior to the provisioning request;

associating a security certificate with the new business unit based on the provisioning request;

determining the one or more of the users comprising the new business unit based on the provisioning request; and in response to the provisioning request, automatically generating a policy for controlling access to the at least another portion of the encrypted data in the new data container by the one or more of the users of the new business unit based on the security certificate; and associating one or more keys for accessing the at least another portion of the encrypted data with the new data container of the data service, the new business unit, a key manager associated with the data service, or a combination thereof based on the policy.

* * * * *